United States Patent [19]

Harmer

[11] Patent Number: 4,904,432
[45] Date of Patent: Feb. 27, 1990

[54] MANUFACTURE OF STRUCTURAL MEMBERS, IN PARTICULAR FURNITURE COMPONENTS

[75] Inventor: Brian Harmer, Benoni, South Africa

[73] Assignee: Agrifibre Developments Limited, Channel Islands, Channel Islands

[21] Appl. No.: 165,709

[22] Filed: Mar. 8, 1988

[51] Int. Cl.$^4$ .............................................. B29C 43/02
[52] U.S. Cl. ..................................... 264/112; 264/120; 264/123
[58] Field of Search ............... 264/109, 120, 122, 123, 264/125, 126, 294, 328.2, 328.4, 328.5, 328.6, 328.17, 328.18, 112

[56] References Cited

U.S. PATENT DOCUMENTS 2,234,644  3/1941  Herglotz .............................. 264/120
3,345,442  10/1967  Oxel ..................................... 264/122

FOREIGN PATENT DOCUMENTS 3021455  12/1981  Fed. Rep. of Germany ...... 264/122
2071560  9/1981  United Kingdom ................ 264/109
2073096  10/1981  United Kingdom ................ 264/123

Primary Examiner—Jan H. Silbaugh
Assistant Examiner—Mary Lynn Fertig
Attorney, Agent, or Firm—Antonelli, Terry & Wands

[57] ABSTRACT

A molded article is molded from a mixed material comprising from 50–94% by weight of sub-divided straw or bagasse, from 6–30% by weight of a synthetic resin or plastics material which binds the straw or bagasse together, and from 0–44% by weight of non-vegetable fillers, the mixed material having a specific gravity of at least 1.0. The invention extends to a method for making a molded article and to compression and molding apparatus for forming a molded article.

12 Claims, 5 Drawing Sheets

MANUFACTURE OF STRUCTURAL MEMBERS, IN PARTICULAR FURNITURE COMPONENTS

FIELD OF THE INVENTION

This invention relates to the composition and manufacture of structural members, most particularly, but not exclusively, structural members which define furniture components, floor or wall tiles or the like, and more particularly the invention is concerned with structural members which are made of sub-divided material bonded together by a synthetic resin or plastics material.

BACKGROUND TO THE INVENTION

It is widely practiced to sub-divide wood into a multitude of chips and then to mix such chips with a synthetic resin or plastics material prior to pressing the material into sheets to produce a material commonly known as chip-board. The product is eminently suitable for numerous different structural purposes, furniture manufacture simply being one of many different applications. However, in regions where timber is not freely available, such a material cannot be practically produced and, in view of the extremely high demand made on the timber resources in timber growing regions, such chip-board is, in any event, relatively costly.

Another product which is manufactured, generally by a pressing process is known as composition board, this material being made of vegetable fibers having their origin in timber and once more mixed with a resinous or plastics material and pressed to form a board or other shaped structural member. Such a board is also costly, and even more so than chip-board, in view of the fact that it is a costly procedure to reduce a timber product to fibers whether this be done chemically or mechanically, Again the inherent cost and value of timber plays an important role in maintaining the cost of such composition board relatively high.

It is well known that a number of sources of fibrous vegetable materials have been totally untapped and, indeed, many of such fibrous vegetable materials are discarded, and indeed, are often simply burned in order to dispose of them.

Of particular interest are vegetable fibers which assume the form of straw or bagasse which are generally discarded in view of the high air or gaseous content of the material and the difficulty of reducing such material to extract the fibres which must generally be carried out chemically.

In this specification, it is to be understood that the term "straw" is intended to include the stalks of grasses, grain products such as barley, wheat, rice and indeed even maize stalks as well as other vegetable products such as bagasse having a generally very low bulk specific gravity in view of the inclusion of large quantities of air or other gases in the structure of the stalk or the like.

It is the object of this invention to provide a composition, and structural members made from such composition as well as a method and apparatus for the production of such structural members which usefully employ such straw or bagasse.

SUMMARY OF THE INVENTION

In accordance with one aspect of this invention there is provided a molded article molded from a mixed material comprising from 50–94% by weight of a sub-divided straw or bagasse, from 6–30% by weight of a synthetic resin or plastics material serving to bind the straw or bagasse together, and, from 0–44% by weight on non-vegetable fillers, colorants or the like, the mixed material having a specific gravity of at least 1.0.

Further features of the invention provide for the specific gravity of the mixed material to be in the region of from 1.1 to 1.5 and preferably about 1.3 to 1.35 and most preferably about 1.32; for the mixed material to comprise from 6–12% by weight of the synthetic resin or plastics material; for the mixed material to comprise predominently sub-divided straw milled sufficiently finely to destroy the basic stalk structure of the straw and conveniently to an average length of approximately 3mm; and for the article to be an optionally reinforced structural member, in particular, a furniture component.

The invention also provides an article of furniture composed predominently of components in the form of molded articles as above defined.

The invention still further provides a method for producing an article as above defined which comprises admixing from 50–94% by weight of sub-divided straw, bagasse, or mixtures thereof, from 6–30% by weight of a synthetic resin or plastics material suitable for binding the straw or bagasse together; and from 0–45% by weight of non-vegetable fillers, colorants or other additives; compressing the loose mixture in a feed auger to result in a partially compressed mixture at the outlet from the feed auger, introducing said partially compressed mixture into a cavity of a press-mold; and press-molding an article in said press-mold by further compression under conditions chosen to cause curing or hardening of the synthetic resin or plastics material.

Further features of this aspect of the invention provide for a predetermined weight of mixture to be fed to the auger via a suitable hopper; for the synthetic resin or plastic material to be either powdered or to be carried in a diluent or solvent to facilitate admixture thereof with the straw or bagasse; for such diluent or solvent to be volatile and to be allowed to evaporate off prior to introduction of the material to the feed auger; for the feed auger to be adapted to compress the loose mixture to reduce its volume to between one-half and one-fifth of its initial volume and, most preferably, to about one-quarter of its initial volume; and for the press-molding operation to further reduce the material exiting from the feed auger to approximately one-fifth of its partially compressed volume at which it is introduced into the press-mold.

It has been found that pressures in the range of from 60kp/cm$^2$ to 130kp/cm$^2$ are effective to achieve the desired reduction in volume of the mixture in the press-mold and, preferably, pressures in the range of about 120–130kp/cm$^2$ are employed.

It will be understood that the kind of vegetable materials with which this invention is concerned, namely straw and bagasse, are fibrous products having an extremely low bulk density due primarily to the inclusion of large quantities of air or other gases within the structure of the stalk. Sub-dividing the stalk has the effect of at least opening gas enclosures within the stalk structure and, as indicated above, preferably the straw is cut to short lengths in a mill or the like, the lengths conveniently being about 3mm in length on average.

In this condition, the straw nevertheless has extremely low bulk density and has to be compressed to about one-twelfth to one-thirtieth of its volume in order to achieve a satisfactory density of the molded article. Most preferably the loose mixture of the sub-divided straw and synthetic resin plastics material is reduced to about one-twentieth of its initial volume, this being achieveable by the application of pressures of the order indicated above in the press-mold.

While, for most designs of furniture components the product material is satisfactorily strong, it is within the scope of this invention to embody reinforcing members within any article made according to this invention such as, for example, reinforcing rods of metal, glass fiber reinforced rein and even perforated metal or synthetic resin plates or sheets. Such reinforcing members can be introduced into the press-molding cavity in a suitable position and are supported therein in any known manner.

The invention still further provides a compression molding apparatus comprising a feed auger adapted to decrease the volume of feed material by a predetermined factor of between 2 and 5, the feed auger having an outlet nozzle communicating, in operation, with a lateral inlet to a press molding cavity having a press-molding piston movable into and out of the press-molding cavity and wherein the piston is adapted to close off the inlet to the press molding cavity during the initial stages of its movement in a compression cycle.

Further features of this aspect of the invention provide for the feed auger assembly to be movable transversely to the direction of movement of the piston of the press-mold to engage and disengage the outlet nozzle with the inlet to the press molding cavity; and for the portion of the feed auger in communication with a feed hopper to be of constant diameter and pitch whereas the portion of the feed auger adapted to compress the feed material has a decreasing diameter and a decreasing pitch.

Finally, the invention provides a press molding assembly comprising a cavity defining cylindrical wall having a plunger slidable along the length of the cavity to maximize and minimize the volume of the cavity selectively, a base plate for carrying one die of a co-operating pair thereof with the plunger being adapted to carry the other die of the pair, the cylindrical wall being movable with respect to the plunger away from the base plate upon completion of a compression cycle and means for moving the cylindrical wall relative to the plunger to maximize the volume of the cavity to receive a charge to be press molded.

In general, the cylindrical wall can simply be a frictional fit over the plunger. The plunger may have any required seals actually engaging between the cylindrical wall and the plunger. Clearly the cylindrical wall could have any required cross-sectional shape which would be dictated by the shape of the component being molded.

In order that the invention may be more fully understood, one example of the various aspects of the invention will now be described with reference to the accompanying drawings.

DETAILED DESCRIPTION WITH REFERENCE TO THE DRAWINGS

Figure 1:
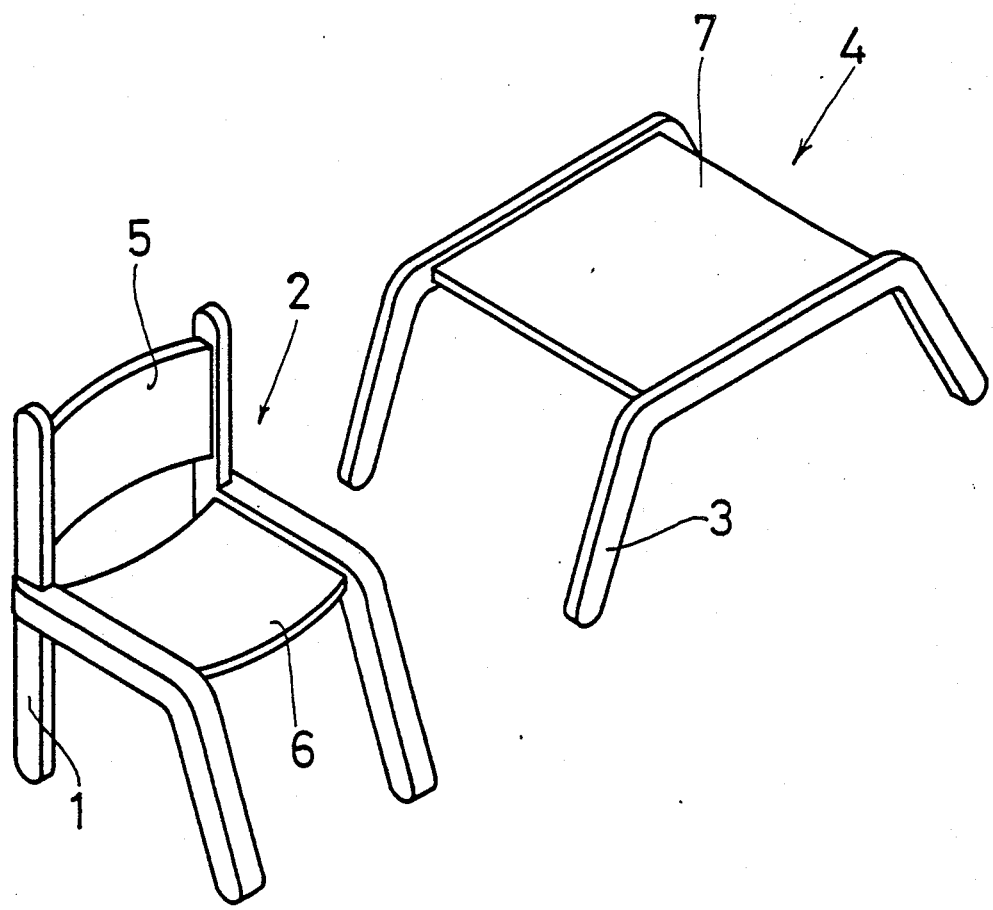
FIG. 1 illustrates in isometric view a chair and table made up of components produced according to this invention.

In the embodiment of the invention components such as legs 1 of a chair 2, legs 3 of a table 4, the backrest 5 and seat 6 of the chair and top 7 to the table are all made by compression molding of a material as provided by this invention.

In this particular case the material comprises simply 88% by weight dried (approximately 6% water), of milled barley straw wherein the milling operation has been chosen to chop the stalks of the straw such that the sub-divided portions thereof are, on average, approximately 3mm long. This milled straw is mixed with 12% by weight of a finely powdered two stage synthetic phenolic resin (such as that sold under the Trade Name "Plyophen 602N") together with hexamine as a cross-linking agent. Such mixing can be effected in any suitable manner such as by tumbling the components together for a suitable length of time.

As an alternative, the resin can be dissolved in a volatile solvent and the straw soaked in such a solution followed by draining of excess solution. In such a case, the proportions of the solvent to the resin will be chosen such that the required weight of resin is retained by the straw. It is to be understood that it is not necessary that the straw be milled as finely as indicated above and, indeed, fairly long lengths of stalks may be used to define the sub-divided straw. The disadvantage of this is that the air sacs within the straw structure remain substantially intact and, accordingly, greater pressures must be used to mold such a mixture.

In view of the fact that substantial compression of the material described above must be effected in order to obtain a component or material having a satisfactory strength and density, special compression molding equipment according to this invention is employed for molding the components.

This compression molding equipment, in this particular embodiment of the invention, is designed to compress the material to about one-twentieth of its initial volume size, this having been found to be a satisfactory compression ratio in the case of the milled barley straw. It may well be that each different type of straw, and indeed, depending on how it is milled, could require a different compression ratio in order to achieve a satisfactory result.

Figure 2:
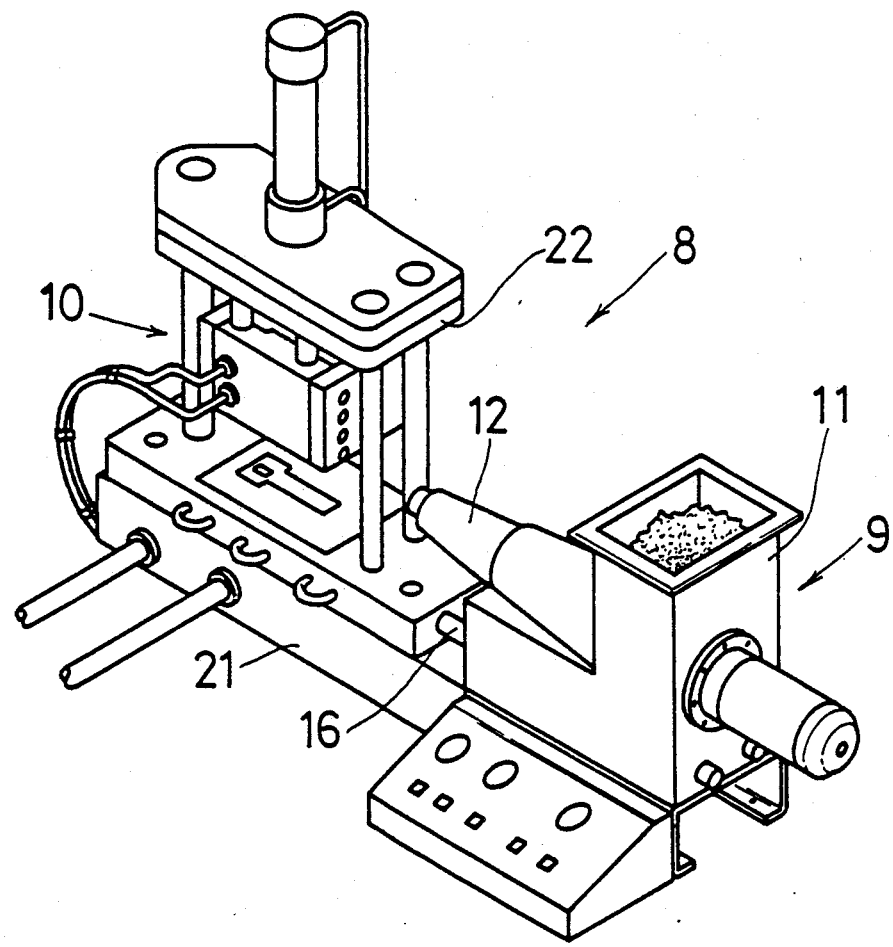
FIG. 2 is an isometric view of compression molding apparatus used for producing components according to this invention.
Figure 3:
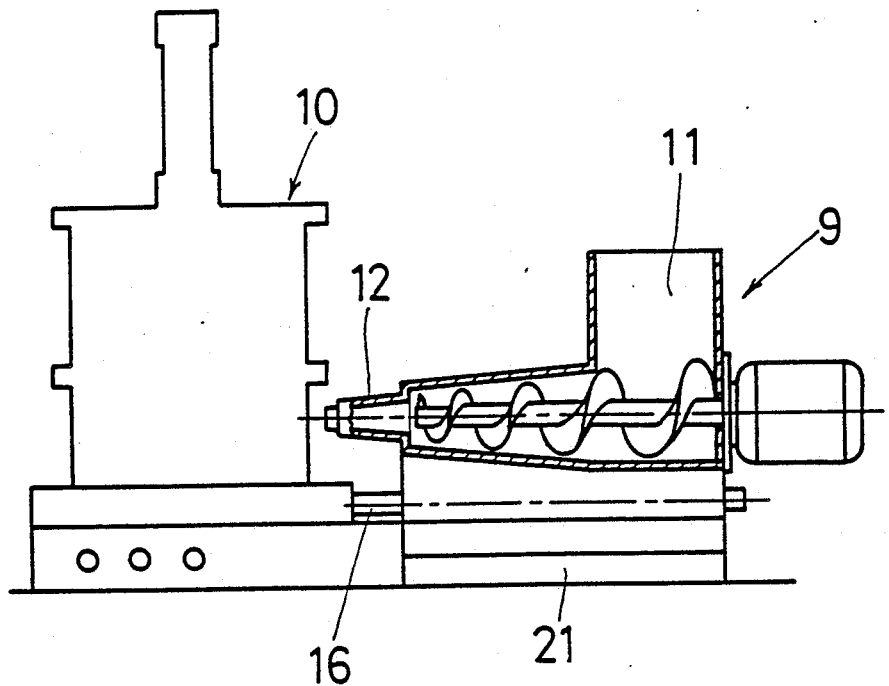
FIG. 3 is a schematic, partly sectioned, front elevation of the apparatus illustrated in FIG. 2.

As shown in FIGS. 2 and 3, compression moulding apparatus generally indicated by numeral 8, is composed basically of two different sections, namely an auger feeder section 9, and a press-moulding section 10.

The auger feeder section 9 simply comprises a hopper 11 into which a preweighed charge of mixed material can be introduced, the auger feeder having a flight which decreases in diameter and pitch to the extend that a compression ratio of 4 to 1 is achieved in this section. An outlet nozzle 12 is provided at the end of the auger feeder, the outlet nozzle being releasably engageable in an inlet aperture 13 in a cylindrical wall 14 carried by the plunger 15 of the press-molding section of the apparatus shown in FIGS. 4 and 5. In order to provide for such disengagement, the entire auger feeder section of the compression molding apparatus is mounted on guides 16, the axes of which extend parallel to that of the auger feeder as shown in FIGS. 2 and 3.

Figure 4:
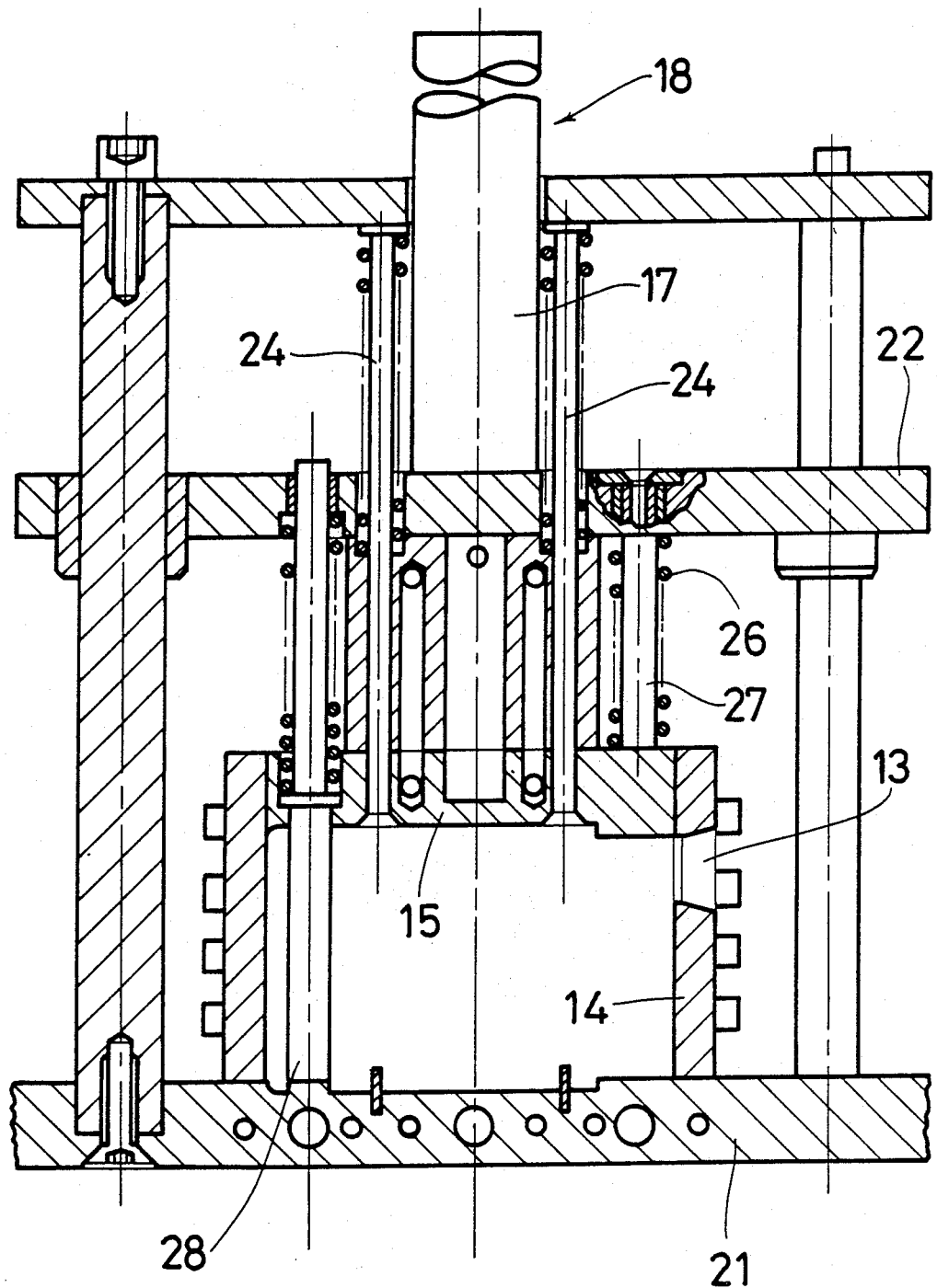
FIG. 4 is a sectional elevation of the press molding section of the molding apparatus in a condition ready to receive, from the auger feeder portion of the compression molding apparatus, a charge of material to be molded; and, FIG. 5 is a similar sectional view to that of FIG. 4 but showing the position of the plunger at the end of its molding stroke.
Figure 5:
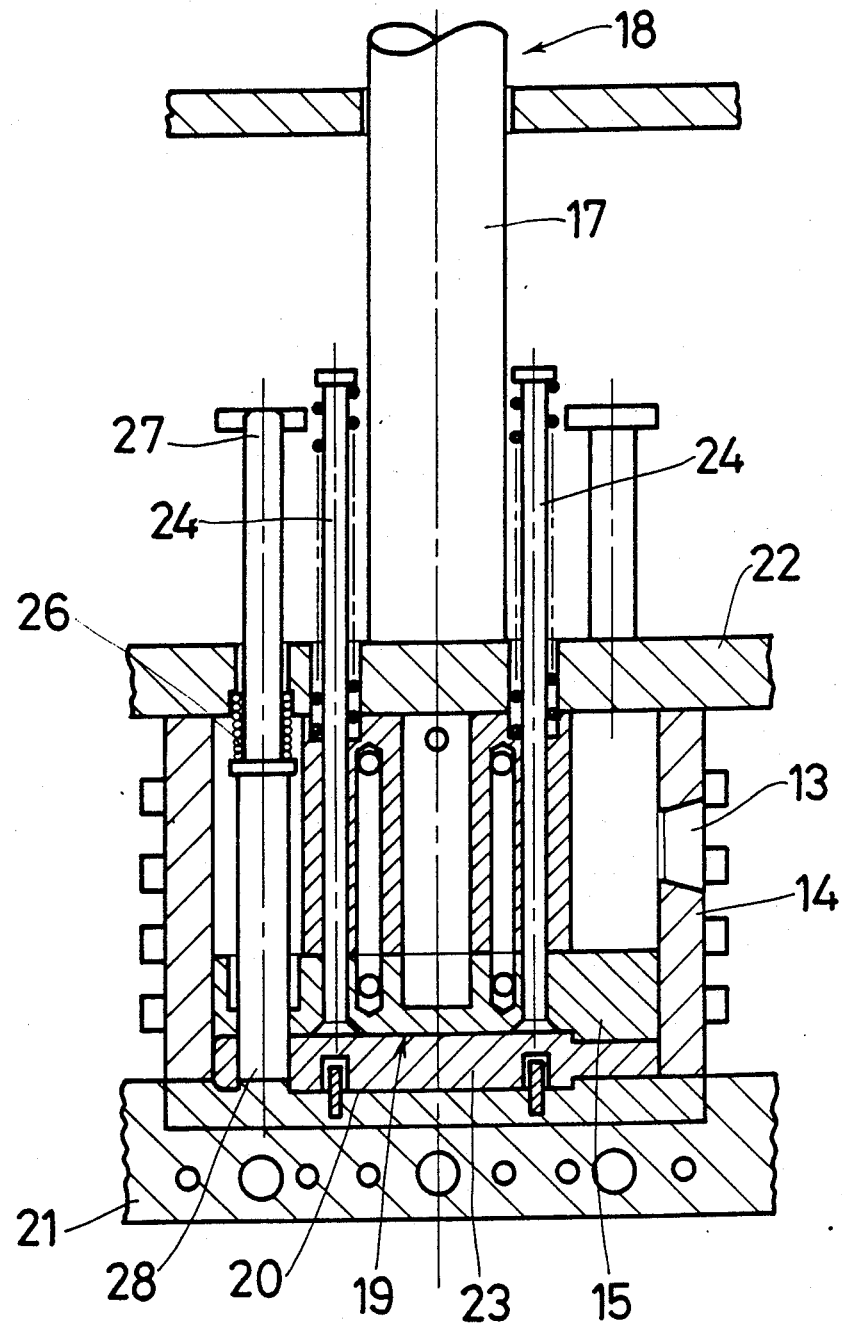

The axis of movement of the plunger is at right angles to that of the auger feeder and the plunger 15 is carried on the end of a piston rod 17 of an hydraulic piston and cylinder assembly 18 as shown in FIGS. 4 and 5.

The plunger carries one half 19 of the co-operating die assembly for forming the final cavity defining the shape of the component to be molded while the other half 20 of the die is mounted on a base plate 21 which supports the entire compression molding apparatus.

The cylindrical wall is a frictional fit on the plunger so that the plunger can move therein in the manner of a piston and cylinder, but the cylindrical wall will move with the plunger unless it abuts either the base plate or an assembly plate 22 spaced upwardly from the base plate. The spacing of these two plates will become quite apparent to those skilled in the art from a description of the apparatus in use.

As shown in FIG. 3, the cylindrical wall, in its charge receiving position, engages as its lower edge the base plate. In this position, the plunger is positioned above the inlet aperture which is, nevertheless, located substantially at the top of the cavity thus defined. In use, a charge of material introduced through the inlet of the auger feeder and is adapted to fill this cavity. Once full, the plunger can be operated. The plunger, during the initial part of its movement, closes the inlet and then continues to compress the material to one-fifth of its volume, thereby resulting in a compression ratio of a total of 20 to 1. The final component 23 (see FIG. 5) is thus formed in the die cavity between the two die halves.

Any required heating and cooling of the die can be achieved in, a substantially conventional manner in order to ensure that the synthetic resin is properly cured.

At the end of a moulding cycle, the plunger is withdrawn and carries with it the component and sidewall.

Spring-looded ejector pins 24 serve to eject the molded component during withdrawal of the plunger and the cylindrical wall is carried with the plunger as shown most clearly in FIG. 2. During this movement, the upper end of the sidewall will strike the retainer plate and while the plunger continues to withdraw, it will be moved upwardly towards the top of the sidewall and, indeed, to the initial starting position relative to the cylindrical wall.

Once operation of the piston and cylinder assembly has ceased, springs 26 on auxiliary guide pins 27 serve to return both the plunger and the sidewall to the starting position in which the lower edge of the sidewall engages the base plate as shown in FIG. 4.

It will be understood that any spring-loaded molding pins 28 can be employed to form holes in the molded component in a known manner.

The apparatus described above will operate effectively to achieve the somewhat substantial degree of compression of the feed material that is required and will lead to a satisfactory product being manufactured from a basic material which is, at the present time, generally discarded or simply burned.

The invention therefore provides an extremely inexpensive composition of material which can be employed for the formation of structural components or, indeed, any articles such as floor tiles, wall tiles but, in particular, furniture components.

What is claimed is:

1. A method for producing an article comprising the steps of admixing form 50–94% by weight of subdivided straw, bagasse, or mixtures thereof, from 6–30% by weight of a synthetic resin or plastics material suitable for binding the straw of bagasse together, and from 0–45% by weight of non-vegetable fillers, colorants or other additives to form a loose mixture; compressing the loose mixture in a feed auger having a portion, in which compression takes place, of decreasing diameter and pitch from an inlet towards an outlet of the feed auger to result in a partially compressed mixture at the outlet of the feed auger; introducing said partially compressed mixture into a cavity of a press-mold; and press-molding an article in said press-mold by further compression under conditions chosen to cause curing or hardening of said synthetic resin or plastics material.

2. The method of claim 1 wherein a predetermined weight of mixture is fed to the auger via a hopper.

3. The method of claim 1 wherein the synthetic material or plastics material is either powdered or carried in a diluent or solvent to facilitate admixture thereof within the straw or bagasse.

4. The method of claim 3, where the synthetic material or plastics material is carried in a diluent or solvent, the diluent or solvent being volatile, the diluent or solvent being allowed to evaporate off prior to introduction of the mixture to the feed auger.

5. The method of claim 1 wherein the feed auger is adapted to compress the loose mixture to reduce its volume to between one-half and one-fifth of its actual volume.

6. The method of claim 5, wherein the loose mixture is compressed to one-quarter of its initial volume.

7. The method of claim 6 wherein the press-molding operation further reduces the mixture to approximately one-fifth of its partially reduced volume at which it is introduced into the press-mold.

8. The method of claim 1 wherein the pressure in the press-mold is between 60kp/cm$^2$ and 130kp/cm$^2$.

9. The method of claim 8, wherein the pressure is between 120kp/cm$^2$ and 130kp/cm$^2$.

10. The method of claim 1, wherein the mixed material is compressed to about one twentieth of its actual volume.

11. The method as claimed in claim 1 wherein a reinforcing material is introduced into the press-mold, the mixture being molded around the reinforcing material.

12. The method as claimed in claim 11, wherein the reinforcing material is one or more of the following : metal rods, glass fiber, resin plates or sheets, and metal plates or sheets.

* * * * *